(12) United States Patent
Bouarroudj et al.

(10) Patent No.: US 10,320,248 B2
(45) Date of Patent: Jun. 11, 2019

(54) ROTOR WITH PERMANENT MAGNETS WITH FLUX CONCENTRATION FOR ROTARY ELECTRICAL MACHINE

(71) Applicant: VALEO EQUIPEMENTS ELECTRIQUES MOTEUR, Creteil (FR)

(72) Inventors: Lilya Bouarroudj, Charenton le Pont (FR); Virginie Leroy, Neuilly sur Marne (FR); Nam-Gook Kim, Saint-Maurice (FR)

(73) Assignee: Valeo Equipements Electriques Moteur, Creteil (FR)

( * ) Notice: Subject to any disclaimer, the term of this patent is extended or adjusted under 35 U.S.C. 154(b) by 173 days.

(21) Appl. No.: 15/316,303

(22) PCT Filed: Jun. 2, 2015

(86) PCT No.: PCT/FR2015/051450
§ 371 (c)(1),
(2) Date: Dec. 5, 2016

(87) PCT Pub. No.: WO2015/185847
PCT Pub. Date: Dec. 10, 2015

(65) Prior Publication Data
US 2017/0141629 A1  May 18, 2017

(30) Foreign Application Priority Data
Jun. 5, 2014 (FR) ...................................... 14 55111

(51) Int. Cl.
*H02K 1/27* (2006.01)
*F25B 31/02* (2006.01)

(52) U.S. Cl.
CPC ............. *H02K 1/274* (2013.01); *F25B 31/02* (2013.01); *H02K 1/2773* (2013.01); *H02K 2213/03* (2013.01)

(58) Field of Classification Search
CPC .......... H02K 1/27; H02K 1/272; H02K 1/274; H02K 1/2753; H02K 1/278; H02K 1/276; H02K 1/2766; H02K 1/2773
(Continued)

(56) References Cited

U.S. PATENT DOCUMENTS 9,716,410 B2   7/2017 Legranger et al.
9,871,420 B2   1/2018 Bouarroudj et al.
(Continued)

FOREIGN PATENT DOCUMENTS

FR     2982093 A1   5/2013
FR     2983658 A1   6/2013
(Continued)

*Primary Examiner* — Nguyen Tran
(74) *Attorney, Agent, or Firm* — Berenato & White, LLC

(57) ABSTRACT

A rotor with permanent magnets for a rotary electric machine including a plurality of alternating north poles and south poles and made up of a plurality of permanent magnets arranged in first recesses extending axially and distributed regularly between a circumferential portion and a central portion of the magnetic mass of the rotor such as to define a plurality of circumferential polar sections, the first recesses being separated by central tabs with a thickness E, the permanent magnets having a polygonal radial section that comprises a substantially rectangular portion next to the circumferential portion adjacent to a substantially trapezoidal portion next to the central portion. The rotor having a ratio R0 (h/E) of a first height h of the trapezoidal portion to the thickness E of a central tab is predetermined such as to maximize the efficiency of the electric machine.

22 Claims, 3 Drawing Sheets

(58) Field of Classification Search
USPC .......... 310/156.38, 156.45, 156.54, 156.55, 310/156.56, 156.57
See application file for complete search history.

(56) References Cited

U.S. PATENT DOCUMENTS

| | | | |
|---|---|---|---|
| 2013/0009505 A1* | 1/2013 | Watanabe | H02K 1/2766 |
| | | | 310/156.08 |
| 2013/0278105 A1 | 10/2013 | Han et al. | |
| 2014/0354104 A1 | 12/2014 | Bouarroudj et al. | |
| 2014/0361656 A1 | 12/2014 | Legranger et al. | |
| 2015/0326080 A1* | 11/2015 | Wakita | H02K 1/2773 |
| | | | 310/156.38 |
| 2016/0013689 A1* | 1/2016 | Ichien | H02K 1/2773 |
| | | | 310/156.38 |

FOREIGN PATENT DOCUMENTS

| | | |
|---|---|---|
| JP | H089599 A | 1/1996 |
| WO | WO2013060960 A2 | 5/2013 |
| WO | WO2013079840 A2 | 6/2013 |
| WO | WO2013079842 A2 | 6/2013 |

\* cited by examiner

ROTOR WITH PERMANENT MAGNETS WITH FLUX CONCENTRATION FOR ROTARY ELECTRICAL MACHINE

CROSS-REFERENCE TO RELATED APPLICATIONS AND CLAIM TO PRIORITY

This application is a national stage application of International Application No. PCT/FR2015/051450 filed Jun. 2, 2015, which claims priority to French Patent Application No. 1455111 filed Jun. 5, 2014, the disclosures of which are incorporated herein by reference and to which priority is claimed.

FIELD OF THE INVENTION

The present invention relates to a rotor with permanent magnets for a rotary electrical machine.

It also relates to a rotary electrical machine comprising a rotor of this type.

It has a particular, but non-limiting application in the field of electric traction motors or motors for accessories in electric and hybrid motor vehicles.

BACKGROUND OF THE INVENTION

As a result of their increased performance in terms of output, specific power and power density, synchronous machines with permanent magnets have an extensive application nowadays in the field of motor vehicles.

These electrical machines can be produced in a wide range of powers and speeds, and have applications both in vehicles of the all-electric type, and in vehicles with low $CO_2$ emission of the types known as mild-hybrid and full-hybrid.

The mild-hybrid applications generally concern electrical machines of approximately 8 to 20 kW, for example an electric motor fitted on the front face of a thermal engine, and coupled to the latter by a drive belt. With an electric motor of this type, it is possible to reduce the cubic capacity of the thermal motorisation (engine downsizing) by providing electric torque assistance which supplies additional power, in particular during restarting. In addition, traction at low speed, for example in an urban environment, can also be ensured by this same electric motor.

Applications of the full-hybrid type generally concern 30 to 50 kW motors for architectures of the series and/or parallel type, with a level of integration which is more complete than that of the electric motor(s) in the traction chain of the vehicle.

Machines with rare earth permanent magnets, such as magnets of the neodymium-iron-boron (NeFeB), samarium-iron (SmFe) or samarium-cobalt (SmCo) type have remarkable performance in terms of magnetic flux, since the rare earth magnets can have remanences which exceed a tesla.

However, machines with permanent magnets comprising a rotor with a so-called "flux concentration" structure have made it possible to obtain substantial magnetic fluxes with magnets with lower remanence, for example magnets obtained from sintered or bonded ferrites.

Since the implementation of rare earth magnets in a rotor of an electrical machine which is designed for motor vehicle applications is no longer economically viable, the other alternative thus consists of magnets based on ferrites.

However, since the remanence or induction of ferrite is lower than in the case of a rare earth magnet, it has been necessary to increase the volume of the ferrite magnet in order to obtain an equivalent magnetic flux. In patent application FR2982093, there has thus been proposed a rotor with permanent magnets with flux concentration having partly a trapezoidal form which makes it possible to increase the volume of the magnets in the rotor.

However, it is still necessary to optimise the dimensional and magnetic characteristics of this type of rotor, such as to improve the magnetic flux, whilst complying with dimensional and mechanical constraints specified.

SUMMARY OF THE INVENTION

For this purpose, the invention proposes a rotor for a rotary electrical machine comprising a plurality of alternating north poles and south poles formed from a plurality of permanent magnets arranged in first recesses which extend axially, and are distributed regularly between a circumferential part and a central part of the magnetic mass of the said rotor, such as to define a plurality of circumferential polar sections, the said first recesses being separated by central tongues with a thickness E, the said permanent magnets having a polygonal radial cross-section comprising a substantially rectangular part close to the said circumferential part adjacent to a substantially trapezoidal part close to the said central part. A ratio R0 of a first height h of the said trapezoidal part to the thickness E of a central tongue is predetermined such as to maximise the performance of the said electrical machine.

The optimisation of the ratio R0 makes it possible to improve the performance of the electrical machine, and to comply with the mechanical constraints specified, in particular when the electrical machine is rotating at high speeds.

According to some non-limiting embodiments, the rotor can also comprise one or a plurality of additional characteristics from amongst the following:

According to a non-limiting embodiment, the ratio R0 can be between 1.9 and 7, and in particular between 2 and 6.

A ratio of this type makes it possible to limit the leakages of flux via the central part of the rotor, whilst making it possible to withstand the mechanical stresses, in particular when the electrical machine is rotating at high speeds.

According to a non-limiting embodiment, the ratio R0 is between 3 and 5.

According to a first variant of a non-limiting embodiment, the ratio R0 is substantially equal to 3.14.

According to a second variant of a non-limiting embodiment, the ratio R0 is substantially equal to 4.44.

According to another variant of a non-limiting embodiment, the ratio R0 can be substantially equal to 5.36.

A ratio R0 of this type is particularly suitable for machines which can reach speeds of rotation of approximately 22,000 revolutions per minute.

A ratio R0 of this type is also suitable for high-power machines, for example machines with power which can be between 10 kW and 60 kW.

A ratio R0 of this type is also designed for machines wherein the outer diameter of the rotor is equal to 115 mm or more.

These different machines are for example reversible machines.

For these different electrical machines, a ratio of this type makes it possible to minimise the leakages of flux via the central part of the rotor, whilst making it possible to withstand the mechanical stresses, in particular when the electrical machine is rotating at its maximum speeds.

According to a non-limiting embodiment, a first recess opens onto the circumferential part by means of an opening which separates one circumferential polar section from an adjacent circumferential polar section, the two circumferential polar sections forming first and second feet which are opposite one another, and are designed to retain a permanent magnet in the said first recess, the said feet comprising a lower face, the said polar sections comprising two longitudinal faces, and having a circular recess at the junction between each longitudinal face and the lower face of a foot.

According to a non-limiting embodiment, a circular recess starts at the junction of the said longitudinal face and the said lower face, and extends along the longitudinal face of a polar section.

According to a non-limiting embodiment, a circular recess starts at the junction of the said longitudinal face and the said lower face, and extends along the lower face of a foot.

According to a non-limiting embodiment, a circular recess is defined such that its centre is situated at the junction of the said longitudinal face of a polar section and the said lower face of a foot.

According to a non-limiting embodiment, a ratio R1 of the diameter of the circular recess to the height of a foot is between 0.4 and 1.

According to a non-limiting embodiment, a ratio R2 of the height of a foot to the width of a foot is between 0.4 and 2.

According to a first non-limiting variant embodiment, the ratio R1 is substantially equal to 0.7, and the ratio R2 is substantially equal to 0.5.

According to a second non-limiting variant embodiment, the ratio R1 is substantially equal to 0.5, and the ratio R2 is substantially equal to 1.6.

The rotor can comprise ten permanent magnets, and in particular twelve permanent magnets.

A rotary electrical machine is also proposed comprising a rotor according to any one of the preceding characteristics.

The electrical machine can be cooled by oil.

According to a first non-limiting embodiment, the said rotary electrical machine is a reversible machine.

According to a second non-limiting embodiment, the said rotary electrical machine is an electrical air-conditioning compressor motor.

The electrical machine can be of the type with power between 4 kW and 60 kW, and in particular between 10 kW and 60 kW.

The invention also relates to a rotor for a rotary electrical machine comprising a plurality of alternating north poles and south poles and formed from a plurality of permanent magnets arranged in first recesses which extend axially, and are distributed regularly between a circumferential part and a central part of the magnetic mass of the said rotor, such as to define a plurality of circumferential polar sections, the said first recesses being separated by central tongues with a thickness E, the said permanent magnets having a polygonal radial cross-section comprising a substantially rectangular part close to the said circumferential part adjacent to a substantially trapezoidal part close to the said central part. A ratio R0 of a first height h of the said trapezoidal part to the thickness E of a central tongue is predetermined such as to minimise the leakages of flux via the central part, whilst making it possible to withstand the mechanical stresses, in particular when the electrical machine is rotating at high speeds.

The preceding characteristics are applicable to this invention alone or in combination.

The invention also relates to a system for a motor vehicle, in particular a hybrid motor vehicle, comprising:
the electrical machine as previously described;
a pump which is designed to convey fluid to the machine, in particular heat-exchange fluid, for example a pressurised oil.

The system can comprise a cooling loop which makes it possible to cool the fluid before it enters the machine via the pump.

The system can comprise a gearbox, the pump also being designed to convey the fluid to the gearbox.

The system can be configured such that the electrical machine activates a shaft of the gearbox.

As a variant, the system can comprise a differential gear, the pump also being designed to convey the fluid to the differential gear.

The system can be configured such that the electrical machine activates a shaft of the differential gear.

BRIEF DESCRIPTION OF THE DRAWINGS

The invention and its different applications will be better understood by reading the following description and examining the figures which accompany it.

DETAILED DESCRIPTION OF THE PREFERRED EMBODIMENT(S)

Elements which are identical in terms of structure or function shown in different figures keep the same references, unless otherwise specified.

Figure 1:
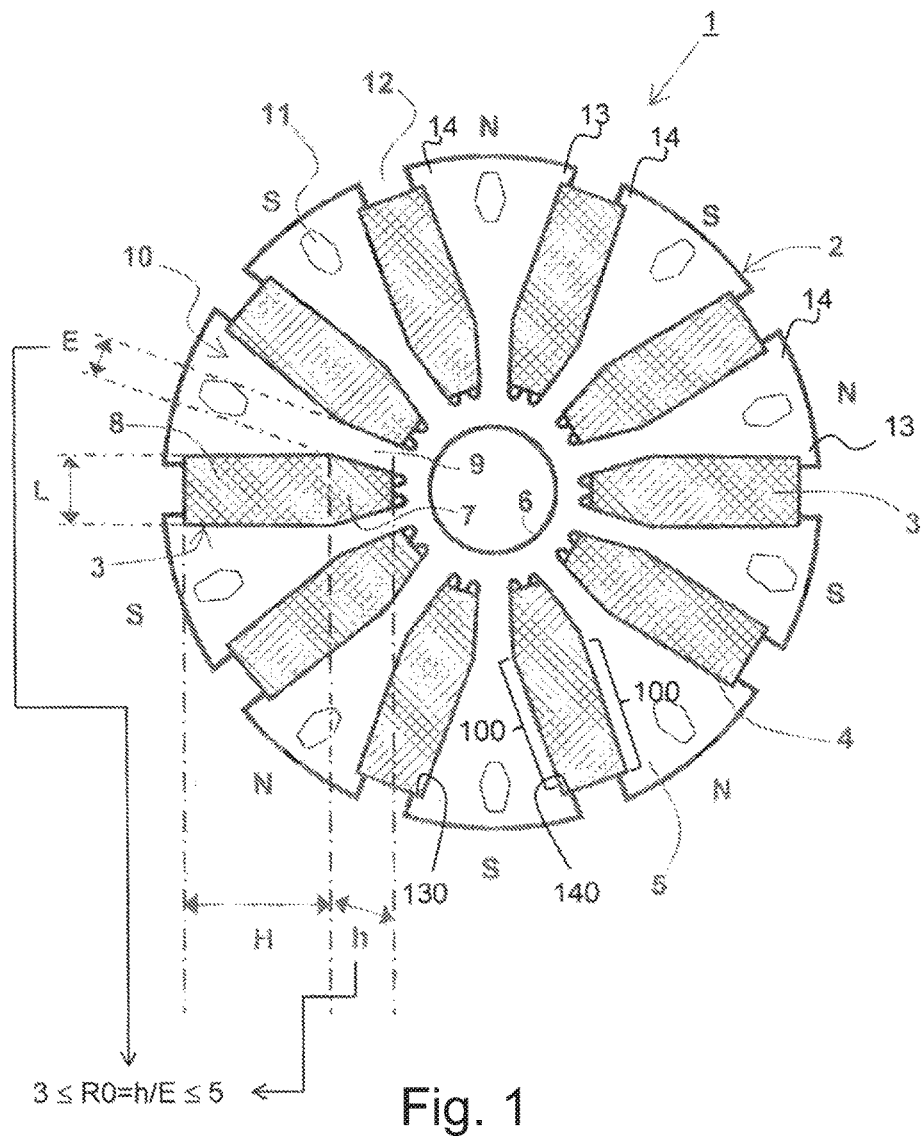
FIG. 1 represents a simplified view in radial cross-section of a rotor with permanent magnets according to a non-limiting embodiment of the invention.

The simplified cross-section of a rotor 1 with permanent magnets according to a non-limiting embodiment represented in FIG. 1 shows clearly the arrangement in the magnetic mass 2 of the permanent magnets 3 in first recesses 4 distributed regularly between a circumferential part 5 and a central part 6, such as to form a plurality of alternating north N and south S poles. The permanent magnets are made of ferrite.

According to a non-limiting example, a first specific embodiment of a machine comprising a rotor of this type is an electrical air-conditioning compressor motor, the said compressor being used to ensure the circulation of the cooling fluid in the cooling circuit, and participating in the functioning of the air conditioning by compressing the fluid when it is in the gaseous phase.

According to a non-limiting example, a second specific embodiment of a machine comprising a rotor of this type is an 8 to 20 kW motor/generator for applications in motor vehicles of the so-called mild-hybrid type. The machine is known as a reversible machine. When it is functioning as a motor, this machine can be designed for the starting of the thermal engine, the torque assistance of the thermal engine, as well as for the electric traction of the vehicle at low speed.

According to a particular non-limiting embodiment of the machine illustrated in FIG. 1, a rotor 1 comprising ten permanent magnets 3 rotates inside a stator (not represented) with a plurality of notches. The magnets 3 are arranged radially such as to obtain a rotor structure of the flux concentration type. The stator and the rotor 1 are produced conventionally with sets of metal plates which form magnetic masses 2. In a non-limiting example, silicon iron metal plate is used.

As illustrated in FIG. 1, part of the magnet 3 close to the central part 6 of the rotor 1 comprises a form in the shape of a wedge. Thus, a radial cross-section of a magnet 3 in the rotor 1 has a substantially trapezoidal part 7 close to the central part of the rotor 1, and a substantially rectangular part 8 close to the circumferential part 5.

A first recess 4 opens onto the circumferential part 5 by means of an opening 12 which separates one circumferential polar section 10 from an adjacent circumferential polar section 10, the two circumferential polar sections 10 forming first and second feet 13, 14 which are opposite one another, and are designed to retain a permanent magnet 3 in the said first recess 4.

The polar sections 10 comprise two longitudinal faces 100, which extend on both sides of the magnets 3, and in particular their substantially rectangular part 8, and the associated feet 13, 14 comprise a lower face 130, 140. A longitudinal face 100 of a polar section 10 is perpendicular to the lower face of a foot 13, 14.

The first recesses 4 which contain the magnets 3 are separated by central tongues 9 forming partitions with a thickness E which is selected with a low value in order to minimise the leakages of flux via the central part 6 of the rotor. In this particular embodiment, the thickness E is constant, but it will be noted that it can be variable in certain embodiments. These tongues 9 retain radially the circumferential polar sections 10 defined in the magnetic mass 2 by the first recesses 4. Since the polar sections 10 themselves retain the magnets 3 radially, the tongues 9 must have minimal mechanical resistance in order to withstand the centripetal forces derived from the effect of the rotation of the rotor 1 on the magnets 3 and the polar sections 10. The thickness E of the tongues must therefore be sufficient to allow them to withstand the mechanical stresses σ, and in particular when the electrical machine is rotating at high speeds.

The rotor 1 additionally comprises a plurality of second recesses 11 arranged in the polar sections 10, as shown clearly in FIG. 1. In addition to their function of contributing to the control of the magnetic field in the rotor 1, these second recesses 11 reduce the mass of the polar sections 10, and consequently reduce the mechanical stresses σ withstood by the tongues 9 because of these polar sections 10, which simultaneously makes it possible to increase the mass of the magnets 3.

The tests carried out with electrical machines comprising a rotor 1 with magnets 3 in the form of a wedge, and computer simulations, have led the inventive body to consider that a ratio R0 of a first height h of the said trapezoidal part 7 to the thickness E of a central tongue 9 is a parameter which makes it possible to optimise the performance of the machine, and to proportion rotor 1 permanent magnets which are suitable for electrical machines which rotate at high speeds.

Tests carried out have shown that a ratio R0 of between 3 and 5 made it possible to obtain satisfactory results for the magnets 3 and central tongues 9 in terms of resistance to the centrifugal forces exerted in the speed range from 0 to 22,000 rpm (revolutions per minute).

It will be noted that the thickness E of a tongue 9 is imposed by the mechanical stresses σ according to the following formula:

$$\sigma = F/V = (m \times Ra \times w2/pp)/(E \times L)$$

i.e:

$E=(m \times Ra \times w2/pp)/(\sigma \times L)$ [1], where F is the centrifugal force ($F = m \times Ra \times w^2$), m is the mass of the magnet plus iron, Ra is the radius relative to the centre of gravity of the rotor, w is the angular speed (rd/s), pp is the number of pairs of poles, V is the volume of the tongue, σ is the mechanical stresses, and L is the length of the rotor.

In addition, it will be noted that the ratio R0 is defined at the electro-technical level by $h/E = (Bs+Bp)/(B_{aim} \times 2)$ [2], where Bs is the magnetic induction with saturation in the tongue, Bp is the magnetic induction with saturation in the polar section, and $B_{aim}$ is the remanent induction of the magnet. It will be noted that $B_{aim}$ depends on the temperature of the ferrite magnet.

Starting with the formula [2], the ratio R0=h/E is determined, then with the formula [1] the thickness E is determined. The height h is thus deduced.

Therefore, take as a non-limiting example a ferrite magnet where Bs=2.2 T and Bp=1.8 T.

In the case of a rotor 1 for an electric compressor motor (speed of approximately 10,000 rpm), the ratio R0=h/E=4.44 is obtained, where $B_{aim}$=0.45 T for a ferrite magnet temperature of 25° C. In this case, the machine is well cooled by the coolant of the compressor.

In the case of a rotor 1 for a reversible machine (speed of approximately 16,000 rpm), the ratio R0=h/E=3.14 is obtained, where $B_{aim}$=0.35 T for a ferrite magnet temperature of 120° C. In this case, the machine is cooled by the motor vehicle gearbox oil.

In the case of a rotor 1 for a reversible electrical machine (speed of rotation which can reach substantially 18,000 rpm to 22,000 rpm), the ratio R0=h/E=5.36 is obtained, where $B_{aim}$ between 0.4 T and 0.5 T for a ferrite magnet temperature of 90° C. An electrical machine of this type can be cooled by oil, for example obtained from a gearbox or a differential gear of the motor vehicle.

Tests with electrical machines comprising a rotor 1 with magnets 3 in the form of a wedge, and computer simulations, have led the inventive body to notice that substantial mechanical stresses σ1 caused by the centrifugal force exerted on the magnets were concentrated on the corner of the magnets 32, in the grip of the feet 13, 14.

In order to avoid deterioration of the rotor 1 caused by these substantial mechanical forces, according to a non-limiting embodiment the polar sections 10 have a circular recess 18 at the junction between each longitudinal face 100 and the lower face 130, 140 of a foot 13, 14. A polar section 10 thus comprises two recesses 18. It will be noted that a junction is formed at a corner 32 of a permanent magnet 3.

Thanks to these circular recesses 18, a decrease in the mechanical stresses is obtained. This therefore makes it possible to reduce the length L1 of the feet 13, 14, which retain a magnet 3 in a recess 4. In addition, the reduction of the width L1 of the feet 13, 14 has the effect of increasing the width of the openings 12. This increase has the effect of reducing the leakage flux at the openings 12, and consequently increasing the magnetic flux generated.

Figure 2:
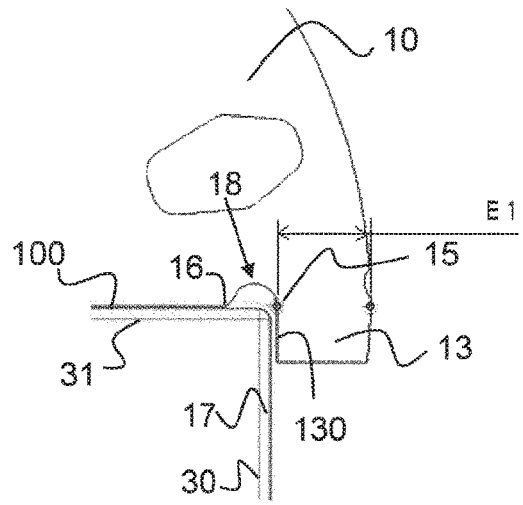
FIG. 2 represents according to a first non-limiting embodiment the structure of part of a polar section of the rotor in FIG. 1 which cooperates with a permanent magnet.
Figure 3:
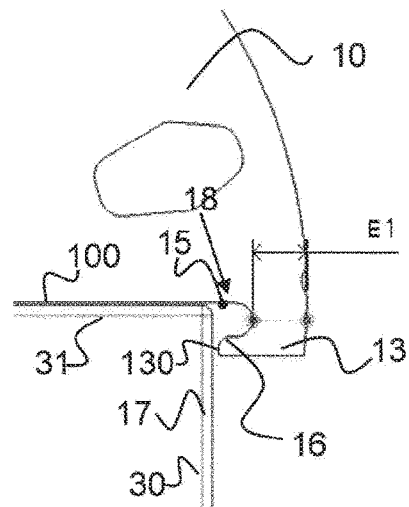
FIG. 3 represents according to a second non-limiting embodiment the structure of part of a polar section of the rotor in FIG. 1 which cooperates with a permanent magnet.
Figure 4:
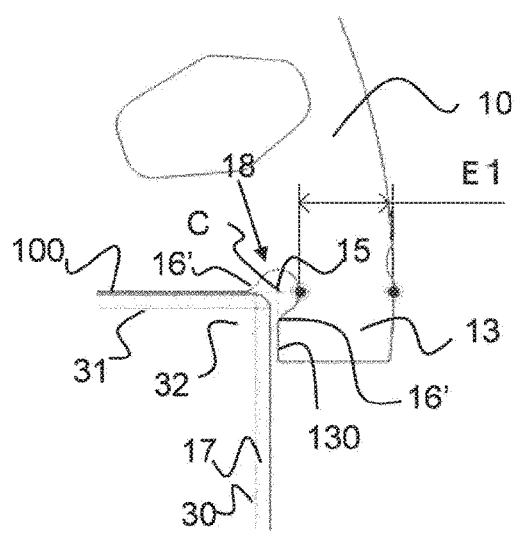
FIG. 4 represents according to a third non-limiting embodiment the structure of part of a polar section of the rotor in FIG. 1 which cooperates with a permanent magnet.

Different variant embodiments of this circular recess 18 are illustrated in FIGS. 2 to 4 in radial cross-section, and are described hereinafter. These figures represent part of a polar section 10 with one of its feet 13, and part of the permanent magnet 3. It will be appreciated that whatever is described hereinafter also applies to the second foot 14.

According to a first non-limiting variant embodiment illustrated in FIG. 2, the said circular recess 18 starts at the junction 15 of the longitudinal face 100 and the lower face 130, and extends along the longitudinal face 100 of the polar section 100.

As can be seen in the figure, the circular recess 18 comprises an end 16 which is connected to the longitudinal face 100 of the polar section 10 without a sharp edge. This makes it possible to avoid having a point which is fragile from the mechanical point of view.

As can also be seen, the circular recess 18 is tangent to a surface of contact with the foot 13. In the non-limiting example illustrated, the contact surface is the upper face of a small lamina 17 arranged between the upper face 30 of the permanent magnet 3 and the lower face 130 of the foot 13. The small lamina 17 has the function of distributing the mechanical forces which are exerted on the top of the magnet 3 and the foot 13, and absorbing by deformation any displacement of the magnet 3. In the case when the machine is subjected to a very high speed of rotation, in fact the magnet 3 tends to move away from the axis of rotation of the rotor under the effect of the centrifugal force. In another example, in the case when there is no small lamina 17, the contact surface is the upper face 30 of the magnet 3.

It will be noted that it is possible to offset the circular recess 18 according to the width of the magnet 3, which makes it possible not to reduce the support surface of the foot 13 on the magnet 3 and the thickness E1 above the magnet 3 (E1 corresponds to the height of the foot 13).

According to a second non-limiting variant embodiment illustrated in FIG. 3, the said circular recess 18 starts at the junction of the said longitudinal face 100 and the said lower face 130, and extends along the lower face 130, 140 of the foot 13.

As can be seen in the figure, the circular recess 18 comprises an end 16 which is connected to the lower face 130 of the foot 13 without a sharp edge. This makes it possible to avoid having a point which is fragile from the mechanical point of view.

As can also be seen, the circular recess is tangent to a surface perpendicular to the foot 13. In the non-limiting example illustrated, the perpendicular surface is the lateral face of the small lamina 17 which is arranged between the lateral face 31 of the permanent magnet 3 and the longitudinal face 100 of the polar section 10. In another example, in the case where there is no small lamina 17, the perpendicular surface is the lateral face 31 of the magnet 3.

It will be noted that it is possible to offset the circular recess 18 according to the height of the magnet 3, but this reduces the support surface of the foot 13 on the magnet 3 and the height E1 of the foot 13.

According to a third non-limiting variant embodiment illustrated in FIG. 4, the said circular recess 18 is defined such that its centre C is situated at the junction of the said longitudinal face 100 and the said lower face 130, 140. As can be seen, the centre C is opposite the corner 32 of the magnet 3.

As can be seen in the figure, the circular recess 18 comprises a first end 16 which is connected to the lower face 130 without a sharp edge, and a second end 16' which is connected to the longitudinal face 100 without a sharp edge.

Figure 5:
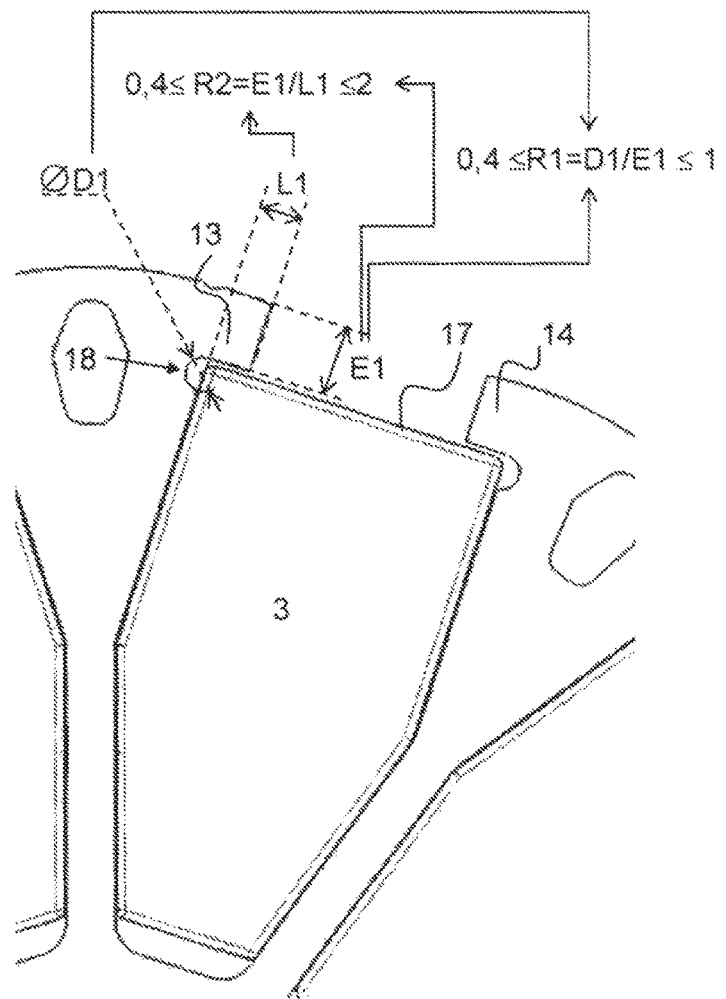
FIG. 5 represents two polar sections of the rotor in FIG. 3 which cooperates with a permanent magnet.

Tests carried out with electrical machines comprising a rotor 1 with magnets 3 in the form of a wedge, and computer simulations, have led the inventive body to consider that a ratio R1 of the diameter D1 of the circular recess to the height E1 of a foot 13, 14 (D1 and E1 being illustrated in FIG. 5) is a parameter which makes it possible to optimise the performance of the machine (maximisation of the magnetic flux) whilst minimising the mechanical stresses σ1. The same applies with a ratio R2 of the height E1 of a foot 13, 14 to the width L1 of a foot 13, 14 (L1 being illustrated in FIG. 5).

The tests carried out have shown that a ratio R1 (D1/E1) of between 0.4 and 1 a ratio R2 (E1/L1) of between 0.4 and 2 made it possible to obtain a good compromise between a circular recess which is optimum from a magnetic point of view and from a mechanical point of view.

In the case of a rotor 1 for a compressor motor (comprising a speed of rotation of 10,000 rpm in a non-limiting example), according to a non-limiting example R1=0.7 and R2=0.5 is obtained.

In the case of a rotor 1 for an alternator-starter (comprising a speed of rotation of 18,000 rpm in a non-limiting example), according to a non-limiting example R1=0.5 and R2=1.6 is obtained.

It will be appreciated that the description of the invention is not limited to the application, the embodiments and the examples described above. Other embodiments based on numerical values different from those specified above, and corresponding to other tests or simulations of rotary electrical machines comprising a rotor of the type described, would not depart from the context of the present invention, provided that they are derived from the following claims.

The invention claimed is:

1. A rotor (1) for a rotary electrical machine, said rotor (1) comprising:
    a magnetic mass (2) including a central part (6) and a circumferential part (5) radially extending from said central part (6) of said magnetic mass (2) of said rotor (1) to define a plurality of circumferential polar sections (10),
    a plurality of alternating north (N) poles and south (S) poles formed from a plurality of permanent magnets (3) arranged in first recesses (4) which extend axially, and are distributed regularly between said circumferential part (5) and said central part (6) of said magnetic mass (2);
    said first recesses (4) being separated by central tongues (9) each having a thickness (E);
    each of said permanent magnets (3) having a polygonal radial cross-section comprising a substantially rectangular part (8) close to said circumferential part (5) and a substantially trapezoidal part (7) close to said central part (6) and juxtaposed to said rectangular part (8);
    a ratio R0 (h/E) of a first height N of said trapezoidal part (7) to said thickness (E) of one of said central tongues (9) is predetermined such as to minimize leakages of flux via said central part, whilst permitting said rotor to withstand mechanical stresses when said electrical machine is rotating at high speeds.

2. The rotor according to claim 1, wherein said ratio R0 is between 2 and 6.

3. The rotor according to claim 2, wherein said ratio R0 is substantially equal to 3.14.

4. The rotor according to claim 1, wherein said ratio R0 is substantially equal to 5.36.

5. The rotor according to claim 1, wherein each of said first recesses (4) opens onto said circumferential part (5) by an opening (12) which separates one circumferential polar section (10) from an adjacent circumferential polar section (10), wherein said two circumferential polar sections (10) form first and second feet (13, 14) which are opposite one another and are configured to retain one of said permanent magnets (3) in one of said first recesses (4), wherein each of said feet (13, 14) comprises a lower face (130, 140), wherein each of said polar sections (10) comprises two longitudinal faces (100) and has a circular recess (18) at a junction (15) between each longitudinal face (100) and said lower face (130, 140) of one of said first and second feet (13, 14).

6. The rotor according to claim 5, wherein said circular recess (18) starts at said junction (15), and extends along one of said longitudinal faces (100) of said polar section (100).

7. The rotor according to claim 5, wherein said circular recess (18) starts at said junction (15), and extends along said lower face (130, 140) of one of said first and second feet (13, 14).

8. The rotor according to claim 5, wherein said circular recess (18) is defined such that a centre (C) thereof is situated at said junction (15).

9. The rotor according to claim 5, wherein a ratio R1 of a diameter (D1) of said circular recess (18) to a height (E1) of one of said feet (13, 14) is between 0.4 and 1.

10. The rotor according to claim 9, wherein a ratio R2 of said height (E1) of one of said feet a foot (13, 14) to a width (L1) of one of said feet (13, 14) is between 0.4 and 2.

11. The rotor according to claim 10, wherein said ratio R1 is substantially equal to 0.7, and wherein said ratio R2 is substantially equal to 0.5.

12. The rotor according to claim 10, wherein said ratio R1 is substantially equal to 0.5, and wherein said ratio R2 is substantially equal to 1.6.

13. A rotary electrical machine, comprising a rotor (1) according to claim 1.

14. The rotary electrical machine according to claim 13, wherein said rotary electrical machine is a reversible machine.

15. The rotary electrical machine according to claim 13, wherein said rotary electrical machine is an electrical air-conditioning compressor motor.

16. The rotor according to claim 2, wherein each of said first recesses (4) opens onto said circumferential part (5) by an opening (12) which separates one circumferential polar section (10) from an adjacent circumferential polar section (10), wherein said two circumferential polar sections (10) form first and second feet (13, 14) which are opposite one another and are configured to retain one of said permanent magnets (3) in one of said first recesses (4), wherein each of said feet (13, 14) comprises a lower face (130, 140), wherein each of said polar sections (10) comprises two longitudinal faces (100) and has a circular recess (18) at a junction (15) between each longitudinal face (100) and said lower face (130, 140) of one of said first and second feet (13, 14).

17. The rotor according to claim 3, wherein each of said first recesses (4) opens onto said circumferential part (5) by of an opening (12) which separates one circumferential polar section (10) from an adjacent circumferential polar section (10), wherein said two circumferential polar sections (10) form first and second feet (13, 14) which are opposite one another and are configured to retain one of said permanent magnets (3) in one of said first recesses (4), wherein each of said feet (13, 14) comprises a lower face (130, 140), wherein each of said polar sections (10) comprises two longitudinal faces (100) and has a circular recess (18) at a junction (15) between each longitudinal face (100) and said lower face (130, 140) of one of said first and second feet (13, 14).

18. The rotor according to claim 4, wherein each of said first recesses (4) opens onto said circumferential part (5) by an opening (12) which separates one circumferential polar section (10) from an adjacent circumferential polar section (10), wherein said two circumferential polar sections (10) form first and second feet (13, 14) which are opposite one another and are configured to retain one of said permanent magnets (3) in one of said first recesses (4), wherein each of said feet (13, 14) comprises a lower face (130, 140), wherein each of said polar sections (10) comprises two longitudinal faces (100) and has a circular recess (18) at a junction (15) between each longitudinal face (100) and said lower face (130, 140) of one of said first and second feet (13, 14).

19. The rotor according to claim 7, wherein a ratio R1 of a diameter (D1) of said circular recess (18) to a height (E1) of one of said feet (13, 14) is between 0.4 and 1.

20. The rotor according to claim 8, wherein a ratio R1 of a diameter (D1) of said circular recess (18) to a height (E1) of one of said feet (13, 14) is between 0.4 and 1.

21. The rotor according to claim 6, wherein a ratio R1 of a diameter (D 1) of said circular recess (18) to a height (E1) of one of said feet (13, 14) is between 0.4 and 1.

22. The rotor (1) according to claim 1, further comprising a plurality of second recesses (11) which extend axially and are arranged in said polar sections (10) between said permanent magnets (3).

* * * * *